United States Patent [19]

Yamaguchi et al.

[11] Patent Number: 4,671,127
[45] Date of Patent: Jun. 9, 1987

[54] VIBRATION SUPPRESSING DEVICE IN A FEED SCREW MECHANISM

[75] Inventors: Toshiaka Yamaguchi; Shirouji Yabe, both of Maebashi, Japan

[73] Assignee: Nippon Seiko Kabushiki Kaisha, Tokyo, Japan

[21] Appl. No.: 678,403

[22] Filed: Dec. 5, 1984

[30] Foreign Application Priority Data

Dec. 15, 1983 [JP] Japan .................. 58-235130

[51] Int. Cl.⁴ .................. F16H 25/20; F16F 15/10
[52] U.S. Cl. .................. 74/89.15; 74/574
[58] Field of Search .................. 74/89.15, 574

[56] References Cited

U.S. PATENT DOCUMENTS

| | | | |
|---|---|---|---|
| 2,331,160 | 10/1943 | Baker et al. | 74/574 |
| 2,361,710 | 10/1944 | Salomon | 74/574 |
| 2,652,700 | 9/1953 | Seibel | 74/574 |
| 2,913,905 | 11/1959 | Clifford | 74/574 |
| 3,075,406 | 1/1963 | Butler et al. | 74/574 |
| 3,163,117 | 12/1964 | Haentjens | 74/574 |
| 3,296,888 | 1/1967 | Schweitzer | 74/574 |
| 3,545,301 | 12/1970 | Richter | 74/574 |
| 3,555,927 | 1/1971 | Plume | 74/574 |
| 4,030,137 | 6/1977 | Dalziel | 360/106 |
| 4,085,627 | 4/1978 | Losee | 74/574 |
| 4,126,066 | 11/1978 | Wagor et al. | 74/574 |
| 4,223,565 | 9/1980 | Sugiyama et al. | 74/574 |
| 4,440,050 | 4/1984 | Kagerer | 74/89.15 |

OTHER PUBLICATIONS

Zimmerman, "Friction for Dampening", Product Engineering, pp. 70–74, Nov. 22, 1965.

Primary Examiner—Lawrence Staab
Attorney, Agent, or Firm—Shapiro and Shapiro

[57] ABSTRACT

In a vibration suppressing device in a feed screw mechanism including a screw shaft rotatably supported on the base bed, and a nut mounted on a movable member fitted on the screw shaft and movable while being guided along the base bed, vibration suppressing means is mounted at a predetermined location on the screw shaft so as to suppress vibration in a radial direction created in the screw shaft during the operation of the feed screw.

3 Claims, 13 Drawing Figures

VIBRATION SUPPRESSING DEVICE IN A FEED SCREW MECHANISM

BACKGROUND OF THE INVENTION

1. Field of the Invention

This invention relates to a vibration suppressing device in a feed screw.

2. Description of the Prior Art

A feed screw mechanism is often used in a mechanical system to accurately move a table or the like by a predetermined amount. The feed screw comprises a screw shaft having a spiral groove formed in the outer peripheral surface thereof, and a nut member having a spiral groove formed in the inner peripheral surface thereof and threadably engaged with the screw shaft, and the nut member is moved relative to the screw shaft by a predetermined amount by the screw shaft being rotated through a predetermined angle.

As a problem peculiar to the feed screw, the thickness of the screw shaft is extremely small as compared with the length thereof and therefore, in the entire mechanical system, particularly the rigidity in a radial direction is small and the screw shaft is very liable to vibrate during operation (the dynamic rigidity is small), and such tendency is conspicuous particularly in a ball screw wherein balls as rolling members are fitted between the screw shaft and the nut member. It has been found that the vibration of the screw shaft leads to noise of the entire machine enploying the mechanical system. Thus, it is very important to reduce the vibration of the screw shaft.

However, various elements creating vibration such as a motor, bearings and a timing belt are connected to the mechanical system including the ball screw and it is difficult to completely eliminate the vibrations from these vibration sources. Also, between the screw shaft and the ball nut, vibratory forces are produced by rolling or circulation of balls, and it is nearly impossible to eliminate such forces. These vibratory forces become greater as the operation speed of the ball screw becomes higher. The above-mentioned minute vibratory forces always act on the screw shaft system, and the screw shaft is very small in dynamic rigidity as previously mentioned. In addition, the screw shaft often creates resonance, and due to the movement of the nut, a resonance frequency exists over a considerable range and therefore, the creation of the vibration and noise of the mechanical system.

The dangerous speed and resonance frequency of the screw shaft are physically determined by the dimensions, shape, etc. thereof independently of the manufacturing accuracy of the various elements and it is impossible to cope with this by the manufacturing technique. It might seem appropriate to support, for example, the intermediate portion of the screw shaft in order to improve the dynamic rigidity of the screw shaft, but since the ball nut moves on the screw shaft, the interference therebetween must be avoided and it is not easy to suppress the creation of the vibration of the screw shaft system and resultant noise by such a simple construction.

SUMMARY OF THE INVENTION

In view of the above-noted situation, the present invention has been made with a view to eliminate the above-noted disadvantages peculiar to the prior art, that is, to suppress the vibration in the radial direction created in the screw shaft and mechanical system during the operation of the feed screw, by a simple construction, without interfering with the movement or the like of the ball nut, and in order to achieve this object, a vibration suppressing member (for example, an antifriction bearing) is mounted at a predetermined location on the screw shaft.

The invention will become fully apparent from the following detailed description thereof taken in conjunction with the accompanying drawings.

DESCRIPTION OF THE PREFERRED EMBODIMENTS

Some embodiments of the present invention will hereinafter be described by reference to the drawings.

Figure 1:
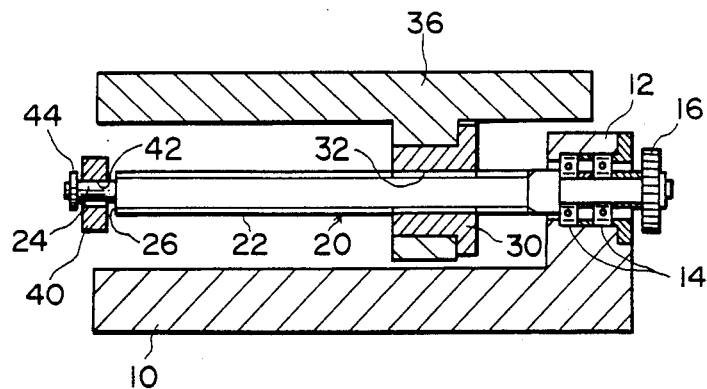
FIG. 1 is a cross-sectional view showing an embodiment in which the present invention is applied to the free end of a screw shaft.

As shown in FIG. 1, one end portion of a screw shaft 20 is rotatably supported on the upright portion 12 of a base bed 10 through a bearing 14, and a belt pulley 16 is secured to a portion projecting from the upright portion 12. A ball nut 30 is threadably engaged with the intermediate portion of the screw shaft 20, and a ball screw groove 22 in the outer peripheral surface of the screw shaft is threadably coupled to a ball screw groove 32 in the inner peripheral surface of the ball nut. A slide table 36 is mounted on the ball nut 30.

The free end of the screw shaft 20 is made into a mounting portion 24 of small diameter, on which is mounted a ring member 40 as vibration suppressing means. The mounting portion 24 is inserted into the insertion hole 42 of the ring member 40, whereafter the ring member 40 is held on the screw shaft 20 by a snap ring 44. The inner diameter of the insertion hole 42 is somewhat larger than the outer diameter of the mounting portion 24 and there is a clearance between the two. Also, the spacing between a stepped portion 26 and the snap ring 44 is considerably greater than the width of the ring member 40.

In the present embodiment, the ring member 40 is mounted on the free end of the screw shaft 20 and moreover, this ring member is movable by an amount corresponding to the clearance in a direction perpendicular to the axial direction of the screw shaft 20. Accordingly, a damping effect is created by the collision between the mounting portion 24 and the ring member 40 to thereby prevent the screw shaft 20 from vibrating in a radial direction and prevent any noise from being created by vibration.

Figure 2A:
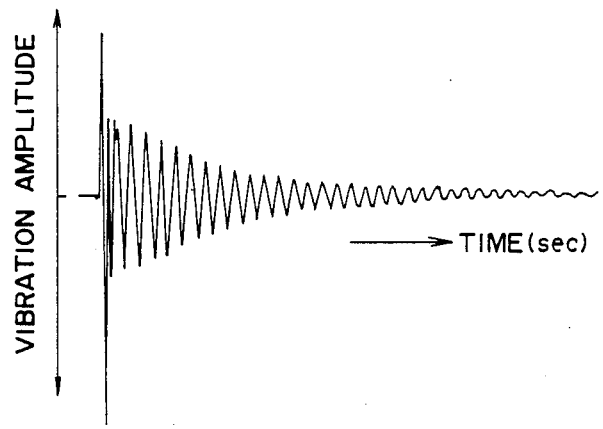
FIGS. 2A, 2B, 3A, 3B, 4A and 4B are graphs showing data from experiments carried out with respect to an example of the prior art and the embodiment of FIG. 1.
Figure 2B:
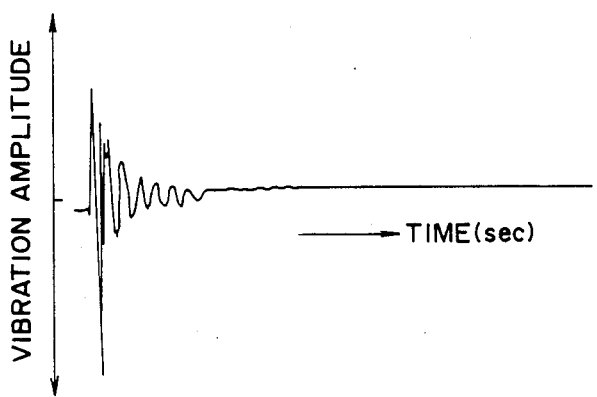

The vibration suppressing effect by the present embodiment will now be described on the basis of the data of an experiment. FIG. 2B is a graph showing the response (time wave form) of the free end in the radial direction when, in the embodiment shown in FIG. 1, impact vibration in the radial direction was imparted to the free end of the screw shaft 22, and FIG. 2A is a similar graph obtained when the ring member 40 was not mounted in the ball screw shown in FIG. 1. As is apparent from the comparison between these two graphs, the vibration amplitude is rapidly attenuated by mounting the ring member 40 and becomes approximate to zero in a short time.

Figure 3A:
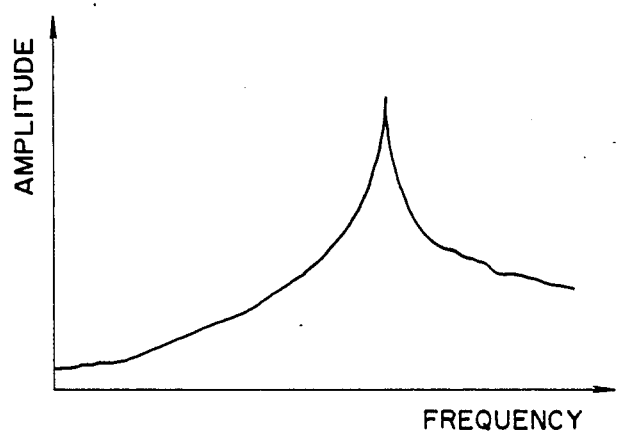
Figure 3B:
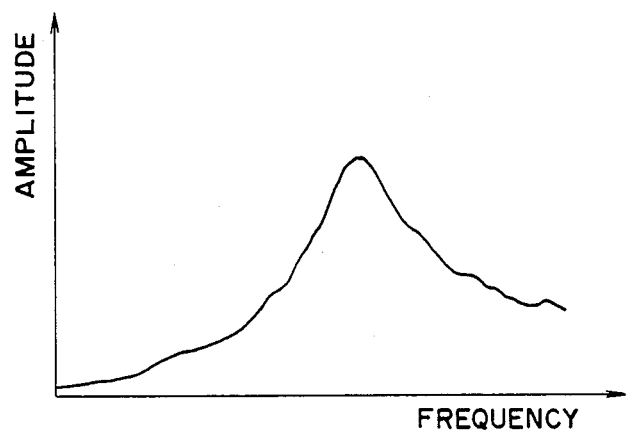

FIG. 3B is a graph showing the transmission function when, in the above-described embodiment, impact vibration in the radial direction was imparted to the free end of the screw shaft 22, and FIG. 3A is a similar graph obtained when the ring member 40 was not mounted. As is apparent from the comparison between these two graphs, the resonance amplitude during the resonance is remarkably decreased by mounting the ring member 40.

Figure 4A:
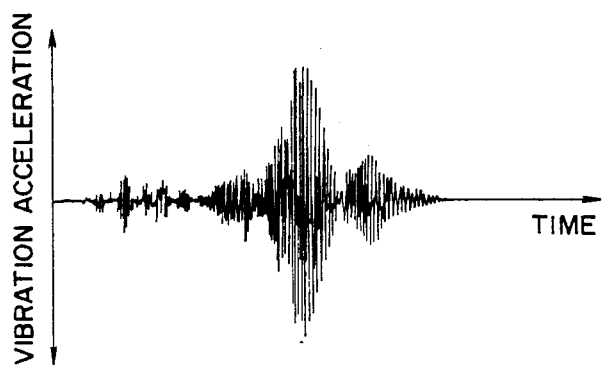
Figure 4B:
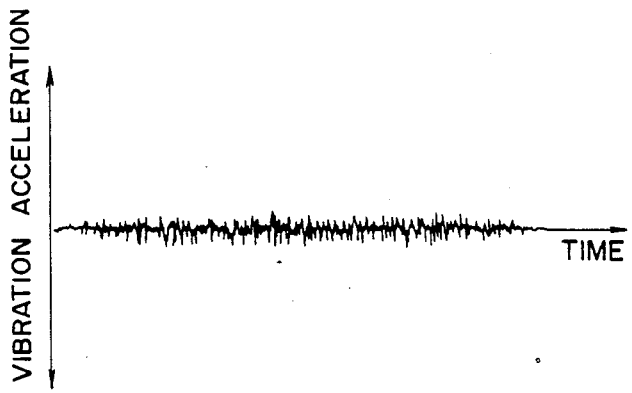

Further, FIG. 4B is a graph showing the vibration acceleration of the table 36 in the above-described embodiment, and FIG. 4A is a similar graph obtained when the ring member 40 was not mounted. As is apparent from the comparison between these two groups, when the ring member 40 was not mounted, the table 36 resonated at various frequencies with movement of the ball nut 30, but these resonance phenomena were caused to almost disappear by mounting the ring member 40.

The shape and size of the ring member 40 are determined by taking into account the magnitude of the vibration created in the screw shaft 20. Also, if the spacing between the stepped portion 26 and the snap ring 44 is made substantially equal to the width of the ring member 40 so that the snap ring 44 and the stepped portion 26 may be in contact with the respective end surfaces of the ring member 40, there will be provided a damping effect by the friction therebetween.

Figure 5:
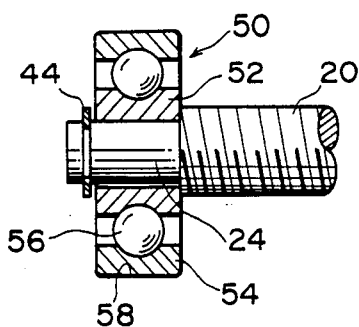
FIGS. 5, 6, 7 and 8 are fragmentary cross-sectional views showing various modifications of the vibration suppressing member.

In an embodiment shown in FIG. 5, a ball bearing 50 is mounted on the mounting portion 24 of the screw shaft 20 and is held by a snap ring 44. There is no clearance between the inner race 52 of the ball bearing 50 and the mounting portion 24, but since the ball bearing 50 comprises three members different in shape and size from one another, i.e., the inner race 52, an outer race 54 and a plurality of balls 56, there is provided a damping effect by the collision between the inner race 52 and the balls 56 or between the outer race 54 and the balls 56 and a damping effect by the viscosity of grease enclosed in the ball bearing 50.

Figure 6:
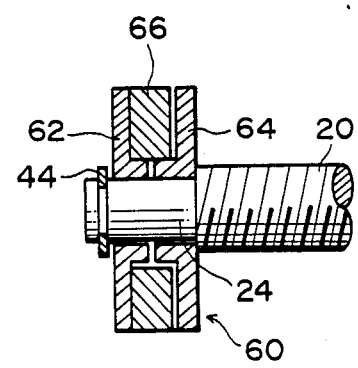

An effect similar to that of the above-described embodiment may also be provided by using a combination ring comprising three members, i.e., a pair of opposed flange members 62 and 64 and a ring member 66 contained in an annular groove defined by the two flange members, as shown in FIG. 6.

Figure 7:
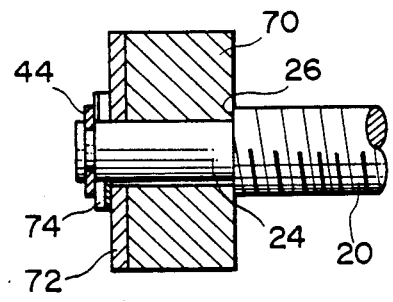

Also, in an embodiment shown in FIG. 7, a ring member 70 is loosely fitted to the mounting portion 24 of the screw shaft 20 while leaving a clearance therebetween, and a friction plate 72 and a corrugated washer 74 are fitted to the outside of the ring member 70 and are held by a snap ring 44. Thus, the friction plate 72 is pressed against the end surface of the ring member 70 by the action of the corrugated washer 74, and vibration of the screw shaft 20 is suppressed by a damping effect based on the friction therebetween. It will be noted that the friction plate 72 may be eliminated and the ring member 70 may be pressed against the stepped portion 26 by the corrugated washer 74.

Figure 8:
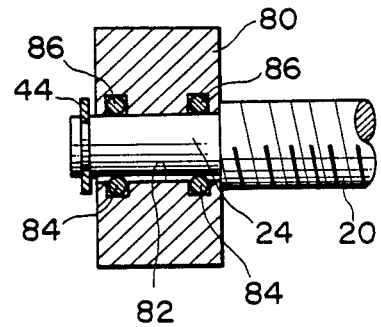

In an embodiment shown in FIG. 8, a ring member 80 is loosely fitted to the mounting portion 24 while leaving a clearance therebetween, and O-rings 86 are loosely fitted in a pair of annular grooves 84 formed in the opposite end portions of the insertion hole 82 of the ring member 80, these O-rings being in contact with the mounting portion 24. The difference of this embodiment from the embodiment shown in FIG. 7 is that the ring member 80 is movable relative to the screw shaft 20 only by an amount corresponding to the elastic deformation of the O-rings 86.

In the embodiment shown in FIG. 8, if grease, viscous fluid or the like is enclosed in the clearance between the ring member 80 and the mounting portion 24 so as to prevent the leakage thereof by the O-rings 86, there can be provided a damping effect by the elastic deformability of the O-rings 86 and the viscosity of the grease or the like.

Figure 9:
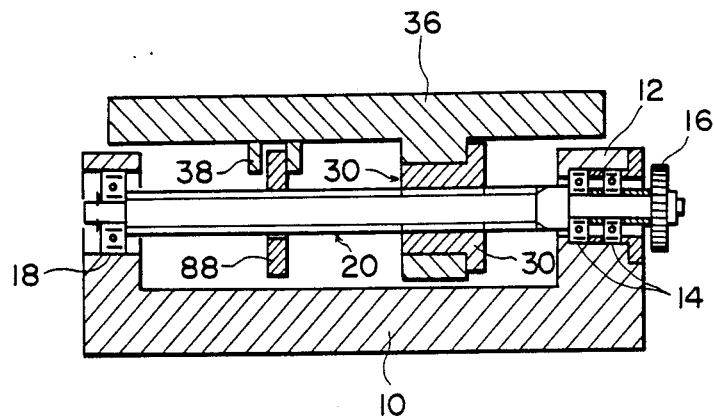
FIG. 9 is a cross-sectional view showing an embodiment in which the present invention is applied to the intermediate portion of the screw shaft.

An embodiment will now be described in which a vibration supressing device is mounted on the intermediate portion of the screw shaft. As shown in FIG. 9, the screw shaft 20 has its opposite end portions rotatably supported by bearings 14 and 18, and a ring member 88 is loosely fitted between the ball nut 30 and the bearing 18. The upper portion of the ring member 88 is engaged with a projection 38 formed on the underside of the slide table 36, and the ring member 88 is movable on the screw shaft 20 with the slide table 36.

Again in such a case where the opposite end portions of the screw shaft are supported, vibration occurs in the screw shaft 20, though slightly as compared with the case where only one end portion is supported (see FIG. 1), but such vibration is prevented by the damping effect of the ring member 88.

If any one of the vibration suppressing members shown in FIGS. 5–8 is selected and used instead of the vibrator comprising the single ring member 88, the aforedescribed effect will be obtained.

An embodiment will now be described in which the screw shaft is made hollow and a vibration suppressing member is inserted therein.

Figure 10:
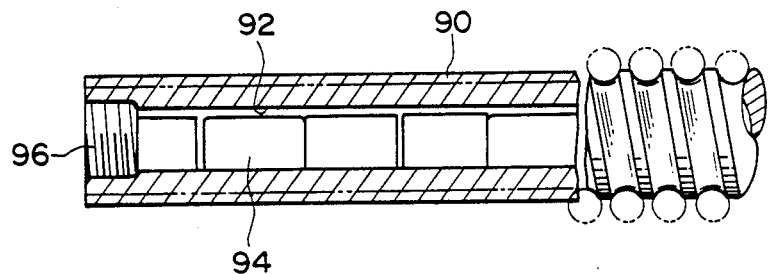
FIG. 10 is a fragmentary cross-sectional view showing an embodiment in which the screw shaft is hollow.

As shown in FIG. 10, a hollow bore 92 is formed in the central portion of a screw shaft 90 axially thereof, and a plurality of rollers 94 are inserted in this hollow bore over the full length thereof and are held in the hollow bore by a pair of screw members (only one of which is shown) 96. Since the outer diameter of each roller 94 is smaller than the inner diameter of the hollow bore 92 and there is a clearance therebetween, there is provided a damping effect by the collision between the rollers 94 and the screw shaft 90.

The manner in which the screw shaft 90 is supported may be that shown in FIG. 1 or that shown in FIG. 9.

The rollers 94 need not always be inserted in the hollow bore 92 over the full length thereof, but may be inserted only in the portion of the screw shaft 90 in which vibration is particularly liable to occur. Further, if springs are interposed between the screw members 96 and the outermost rollers 94 to bring the rollers into contact with one another, there will be provided a damping effect by the friction force between the rollers, and if friction members are interposed between the screw members 96 and the rollers 94, there will also be provided a damping effect by the friction force between the friction members and the rollers. Also, if viscous fluid is enclosed in the hollow bore 92, there will be provided a damping effect by the viscosity of the fluid, and if such viscous fluid is circulated in the hollow bore, there will be provided not only a damping effect but also a cooling effect. The above-described various damping effects are variable by suitably changing the shape, size and number of the rollers 94. Of course, the rollers 94 may be replaced by balls or other members or mateirals having a mass.

In the present invention, as described hitherto, vibration suppressing means is mounted at a predetermined location on the screw shaft, whereby the dynamic rigidity of the screw shaft is improved and vibration created in the feed screw itself and the mechanical system incorporating the feed screw and the noise based on the vibration can be suppressed.

What is claimed is:

1. A vibration suppressing device in a feed screw mechanism including:
    a base;
    a screw shaft rotatably supported by said base;
    a screw nut threadably mounted on said screw shaft to move along said screw shaft by rotation thereof;
    means for damping radial vibration of said screw shaft created in operation of said feed screw mechanism, said damping means comprising two parts that collide in response to radial movement therebetween when said screw shaft vibrates radially, one of said parts being constituted by a damping mass body supported on said screw shaft for limited radial movement relative to the other of said parts; and
    a holding member secured to a movable member mounted on said screw nut and engaged with said damping mass body for moving the same along said screw shaft.

2. A vibration suppressing device according to claim 1, wherein said screw shaft comprises a ball screw shaft and said screw nut comprises a ball screw nut mounted thereon via balls, said ball screw shaft being supported by said base at both ends thereof, and said damping mass body comprising an annular member at a middle portion of said ball screw shaft.

3. A vibration suppressing device in a feed screw mechanism including:
    a base;
    a ball screw shaft rotatably supported by said base at one end thereof to form a cantilever with an opposite free end;
    a ball screw nut threadably mounted on said ball screw shaft via balls to move along said ball screw shaft by rotation thereof; and
    means for damping radial vibration of the ball screw shaft created in operation of said feed screw mechanism, said damping means comprising two parts that collide in response to radial movement therebetween when said ball screw shaft vibrates radially, said two parts being portions of a ball bearing having an inner race mounted on said screw shaft, a coaxial outer race and balls between said races, one of said two parts being constituted by the balls, and the other of said two parts being constituted by at least one of said races.

* * * * *

UNITED STATES PATENT AND TRADEMARK OFFICE
CERTIFICATE OF CORRECTION

PATENT NO. : 4,671,127
DATED : June 9, 1987
INVENTOR(S) : Toshiaki Yamaguchi & Shirouji Yabe It is certified that error appears in the above-identified patent and that said Letters Patent are hereby corrected as shown below:

Change the first-named inventor from "Toshiaka Yamaguchi" to --Toshiaki Yamaguchi--.

Signed and Sealed this

Twenty-seventh Day of October, 1987

Attest:

DONALD J. QUIGG

Attesting Officer

Commissioner of Patents and Trademarks